Jan. 1, 1963 A. F. SKIDMORE 3,071,005
VARIABLE CHAMBER SAMPLER AND TRANSFERENCE APPARATUS
Filed Jan. 19, 1960 2 Sheets-Sheet 1
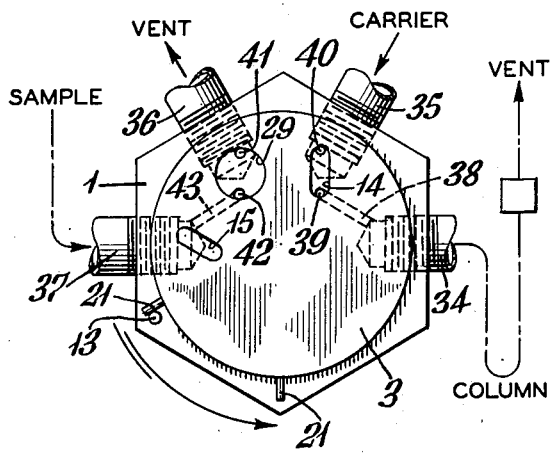
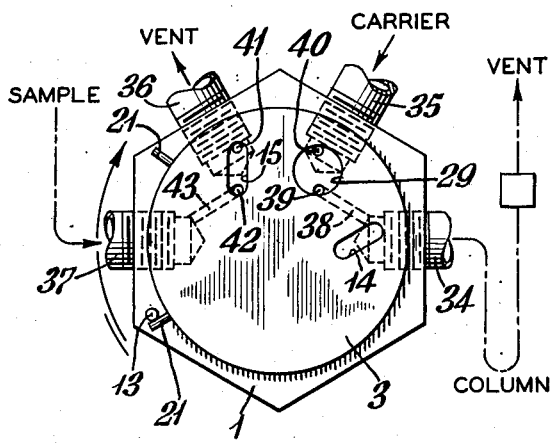
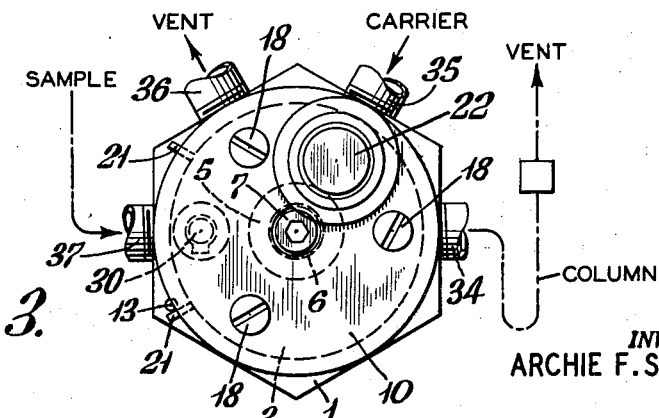
INVENTOR
ARCHIE F. SKIDMORE
BY Howard K. Kothe
ATTORNEY Jan. 1, 1963

A. F. SKIDMORE 3,071,005

VARIABLE CHAMBER SAMPLER AND TRANSFERENCE APPARATUS

Filed Jan. 19, 1960

INVENTOR
ARCHIE F. SKIDMORE

BY Howard K. Kothe

ATTORNEY

United States Patent Office 3,071,005
Patented Jan. 1, 1963

3,071,005
VARIABLE CHAMBER SAMPLER AND
TRANSFERENCE APPARATUS
Archie F. Skidmore, Nitro, W. Va., assignor to Union
Carbide Corporation, a corporation of New York
Filed Jan. 19, 1960, Ser. No. 3,351
4 Claims. (Cl. 73—422)

The present invention relates to a fluid sampling and transference apparatus for use in analysis systems in which successive samples of fluids are continuously drawn from one fluid stream and introduced into another fluid stream and more particularly to such an apparatus capable of having the volume of its fluid sample chamber adjusted with a high degree of accuracy.

The invention is particularly valuable as a component in a vapor fraction analysis system, but is not limited in its use to that field alone. Illustrative of the many uses to which this apparatus can be adapted are making synthetic gas mixtures in very small quantities where a high degree of accuracy is required; liquid sample transference to automatic titration apparatus; pH control systems where small, accurately measured quantities of reagents are necessary and, in general, any fluid sampling operation where small, accurate samples of varying amounts are desired.

In a typical vapor fraction analysis system, multi-component vapor samples are successively introduced into a stream of carrier gas, for example, helium, and flushed through an analyzer tube or column which is packed with inert particles which have been coated with a low vapor-pressure liquid, such as a silicone. Each component vapor in the the sample volume has a different adsorption affinity for the packing material in the column. The component of the sample with the lowest adsorption coefficient will be eluted from the analyzer column first and the component with the highest adsorption coefficient for the packing material will be eluted last. This results in the effective separation of the various components of the multi-component sample and the components issue from the column in bands, each in binary mixture with the continuously flowing carrier gas. Detection and quantitative measurement of each of the components of the sample is accomplished by including one thermally sensitive electrical element in the carrier gas stream for a reference measurement and one in the stream of binary mixtures for their measurement. These thermal elements form two arms of an electrical bridge circuit whose output signals are a measure of the difference between the thermal properties of the reference and binary mixture streams and therefore are interpreted as the percent by volume concentration of the components of interest in the binary mixtures. Variations in the thermal element of the measuring cell are caused by the variations in thermal properties of the progressive bands of the binary mixtures eluted from the chromatographic column. These create bridge unbalances which are read by any suitable detector means, such as a recording potentiometer.

Users of analysis systems based on the principle of vapor fractometry (also known as vapor phase or gas chromatography) have long sought an apparatus which will measure and transfer fluid samples with consistently high reproductive accuracy and with minimum interruption of the process and analysis streams. Various types of sampling and transference apparatus used commercially do not measure samples accurately with the consistent results demanded by chromatographic analysis. Other devices of suitable accuracy for laboratory use, do not have the high reproduction ability essential to commercial applications of chromatographic analysis. It is also most desirable to be able to vary sample volumes without stream shutdown. Presently known sampling and transference devices have either fixed volume loops which may be interchangeable to vary the sample volume or some other arrangement of interchangeable or fixed but selectable sample measuring chambers, allowing only stepwise adjustment of the volume of the sample and usually requiring stream shutdown to accomplish a sample chamber volume change. To fulfill these needs and solve these problems is the object of the present invention. The present invention provides a solution for many problems which confront chromatographic instrument builders and users, particularly in those fields where very accurate and consistent measurements of minute quantities of fluids are concerned.

In general, the invention comprises a two-section, multiport valve assembly containing a sample chamber in one of said sections, a piston, a micrometric control means, connection means between said piston and said control means and means for connection into at least two fluid streams, said chamber being constructed within the valve assembly in such a manner that the piston, located within the chamber and operably connected to the micrometric control means, may be moved reciprocally along the axis of the chamber to vary the chamber volume as desired. The chamber volume can be varied from zero up to a maximum which is dependent only upon the size of the chamber, by means of turning the index dial of the micrometrically controlled piston. The apparatus is unique in its simplicity and the ease with which samples can be repeatedly transferred from one stream to another, without variation in volume, once the sample chamber volume is set at a predetermined corresponding index dial reading.

In the drawings:

FIGURE 1 is a partially schematic sectional view through the variable chamber portion of a gas sampling and transference apparatus when the apparatus is set in the "run" position;

FIGURE 2 is a partially schematic sectional view through the variable chamber portion of the apparatus when it is set in the "measure" position;

FIGURE 3 is a partially schematic top view of the apparatus;

Figure 4:
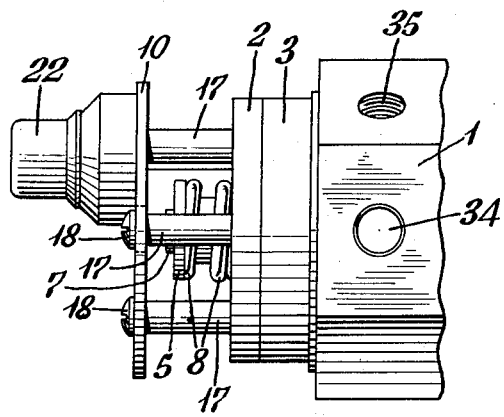
FIGURE 4 is a side view of the apparatus.
Figure 5:
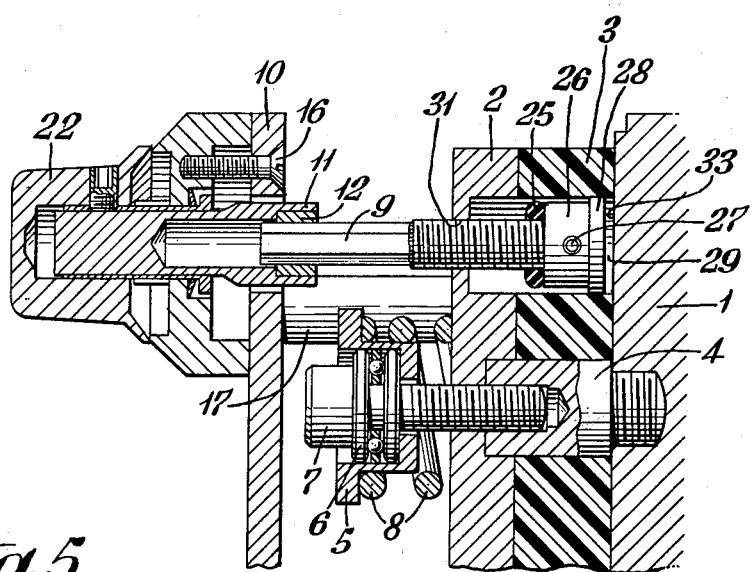
FIGURE 5 is a main cross-sectional view through the upper or variable chamber portion of the apparatus.

In the embodiment of the drawings, the invention comprises a commercially made micrometric indicator assembly 22 situated on top plate 10 and secured thereto by screw 16, said indicator assembly connected to an adaptor 11 fitted with a female insert 12, having a hexagonal cross section, through which passes a precision-fitted freely-sliding connecting shaft 9, having a hexagonal cross-section. Connecting shaft 9 is soldered or otherwise securely affixed to machined screw and piston cup member 26 which screws through threaded hole 31 of metal rotary disc 2. These threads are precision made so that the movement resulting from the screwing action will be in the order of micrometer accuracy. Plastic piston 28 is fitted into the cup portion of member 26 and secured thereto by precision fitted pin 27. O-ring 25, placed at the junction of the threaded and cup portions of machined screw and piston cup member 26 acts as a cushion means to prevent jamming the threads or twisting them out of shape when the piston cup 26 is backed up with force against the top section of metal rotary disc 2.

Metal rotary disc 2 and plastic rotary disc 3, each machined to smooth surfaces on both sides, are registered and attached securely to each other by means of screws and locating pins. The plastic disc 3 contains passages 14 and 15 milled in its bottom surface and also a bored and reamed hole to form sample chamber 29. The milled passages 14 and 15 face the top surface 33 of metal body 1 in which holes 38, 39, 40, 41, 42 and 43 are drilled, holes 38, 40, 41 and 43 connecting respectively to side connecting ports 34, 35, 36 and 37 which are also drilled in metal body 1; and holes 39 and 42 respectively connecting holes 38 and 41 to the top surface 33 of metal body 1. The apparatus is so assembled and operated that one of the milled passages is in register with either of two sets of holes, while the sample chamber space 29 is in register with the other set of holes. The combined metal and plastic rotary discs 2 and 3 are held to and compressed against top surface 33 of metal body 1 by means of compression spring 8, held by spring collar 5, secured by adjusting screw 7 which is screwed into center post piece 4. Thrust bearing assembly 6 is provided between spring collar 5 and adjusting screw 7 to facilitate pressure adjustment of the apparatus. The threaded stud on center post piece 4 is screwed into a drilled and tapped hole through the top surface 33 of metal body 1. By means of this arrangement, compression can be adjusted to the pressure requirements of the system in which the apparatus is installed.

Top plate 10, upon which is mounted micrometric indicator assembly 22, is separated from the rotary disc assembly 2 and 3 by means of spacers 17, each secured by two screws. Rotation of the upper parts is performed by applying force to pin 30, which is held in a hole in metal rotary disc 2 by means of a roll pin. Movement may be manual or by means of an automatic programmed mover connected to pin 30. Rotation limiting pins 21, projecting from the side of metal rotary disc 2, and stop pin 13, projecting from metal body 1, are provided and arranged to limit rotational travel, thus bringing the internal passages and chamber of the apparatus into proper register.

With specific reference to FIGURE 1 of the drawings the apparatus is there shown in the "run" position with the "run" limiting pin 21 against stop pin 13. With the apparatus in this position the sample to be analyzed enters, through suitable conduit means, sample connecting port 37, flows through holes 43 and 42, emerging at top surface 33 of metal body 1 into sample chamber 29 which is in register with holes 42 and 41. After the sample stream fills the chamber 29, it flows out of through hole 41 to vent port 36 and is conducted therefrom by suitable conduit means to the desired vent location. At the same time, carrier gas entering carrier port 35, through suitable conduit means, flows through hole 40, emerging at top surface 33 of metal body 1 into milled passage 14 which is in register with holes 40 and 39, thence through holes 39 and 38 to outlet port 34. From this point the carrier gas stream is conducted by suitable conduit means to the chromatographic column and measuring cell or other apparatus, depending on the system in which the invention is employed, and thence to a vent.

To transfer the sample volume to the carrier stream it is necessary to rotate the metal and plastic rotary disc assembly 2 and 3 to the position shown in FIGURE 2 of the drawings, where the "measure" limiting pin 21 bears against stop pin 13, bringing milled passage 15 into register with holes 42 and 41 and sample chamber 29 into register with holes 40 and 39. This accomplishes introduction of the trapped sample into the carrier gas stream and the carrier gas now emerging from hole 40 at the top surface 33 of metal body 1, flushes the measured sample out through holes 39 and 38 and outlet port 34, through conduit means, to the chromatographic analyzer or other apparatus. This same rotational movement brings milled passage 15 into register with holes 42 and 41, previously covered by sample chamber 29, thus completing passage connection between sample port 37 and vent port 36, allowing continuance of the sample stream flow.

In a typical application, the present invention was employed in conjunction with a chromatographic analyzer apparatus used to measure the impurities in a continuous isopropyl ether stream at a pressure of about 5 pounds per square inch gage and a temperature of 37° C. The carrier gas employed was helium at a pressure of 3 pounds per square inch gage and a temperature of 37° C. with a flow rate of 40 cubic centimeters per minute. The volume of the sample chamber was set to 0.1 milliliter and the automatic programmer of the chromatographic apparatus was set to transfer a 0.1 milliliter sample from the isopropyl ether stream into the carrier gas stream every 13 minutes. During a run lasting approximately 60 hours, impurities comprising 2-butene, butadiene, ethylene, carbon dioxide and ethane were found to be present in the sampled stream in amounts ranging between 50 to 200 parts per million. These impurities are normally present in isopropyl ether such as that sampled in amounts of about 200 parts per million.

This example illustrates the ability of the present invention to repeatedly trap and transfer accurately measured small-volume samples. Measuring and transference apparatus ordinarily available for such applications are incapable of handling such small volumes with the consistent accuracy manifested by the present invention.

This invention has the following advantageous features:

It can be employed to measure any desired volume within the limits of the volume of the sample chamber and can be used to measure much smaller volumes than have heretofore been measured by the known apparatuses. It measures sample volumes with consistent accuracy once the variable chamber is set for a given volume. The volume adjustment is continuous from zero to the maximum capacity of the sample chamber. The apparatus can be operated either manually or automatically by the use of various kinds of commercially available actuating equipment. The apparatus is easily cleaned and maintained in operation. It can be used for liquids, gases, vapors or fluid mixtures.

What is claimed is:

1. Apparatus for the accurate measurement of fluid samples and the transference thereof from one fluid stream to another fluid stream comprising, in combination, a fixed section and a movable section compressively held in sliding contact; said fixed section being provided with a plurality of first passage means and a plurality of conduit connection means arranged to form inlet and outlet connections with at least two fluid streams; said movable section being provided with a plurality of second passage means and a sample chamber; said first passage means connecting to said conduit connection means and being capable of registering with said second passage means and with said sample chamber; said second passage means and said sample chamber spaced and disposed in said movable section for selectively connecting said sample chamber to one of said fluid streams while concurrently connecting certain of said second passage means to the remaining fluid streams; said sample chamber being provided with volumetric adjustment means comprising a precisely-fitted, reciprocally-movable piston within said sample chamber and means for the accurate positioning of said piston within said chamber; and means for slideably positioning said movable section with respect to said fixed section to selectively connect said sample chamber to any one of said fluid streams.

2. Apparatus for the accurate measurement of fluid samples and the transference thereof from one fluid stream to another fluid stream comprising, in combination, a fixed section and a rotor section compressively held in sliding contact; said fixed section being provided with a plurality of first passage means and a plurality of conduit connection means arranged to form inlet and outlet connections with at least two fluid streams; said rotor section being provided with a plurality of second passage means and a sample chamber; said first passage means connecting to said conduit connection means and being capable of registering with said second passage means and with said sample chamber; said second passage means and said sample chamber spaced and disposed about the rotational axis of said rotor section for selectively connecting said sample chamber to one of said fluid streams while concurrently connecting certain of said second passage means to the remaining fluid streams; said sample chamber being provided with volumetric adjustment means comprising a precisely-fitted, reciprocally-movable piston within said sample chamber and means for the accurate positioning of said piston within said chamber; and means for rotatably positioning said rotor section with respect to said fixed section to selectively connect said sample chamber to any one of said fluid streams.

3. Apparatus for the accurate measurement of fluid samples and the transference thereof from one fluid stream to another fluid stream comprising, in combination, a fixed section and a movable section compressively held in sliding contact, said fixed section being provided with a plurality of first passage means and a plurality of conduit connection means arranged to form inlet and outlet connections with two fluid streams; said movable section being provided with a plurality of second passage means and a sample chamber; said first passage means connecting to said conduit connection means and being capable of registering with said second passage means and with said sample chamber; said second passage means and said sample chamber spaced and disposed in said movable section for selectively connecting said sample chamber to one of said fluid streams while concurrently connecting one of said second passage means to the remaining fluid stream; said sample chamber being provided with volumetric adjustment means comprising a precisely-fitted, reciprocally-movable piston within said sample chamber and means for the accurate positioning of said piston within said chamber; and means for slideably positioning said movable section with respect to said fixed section to selectively connect said sample chamber into either one of said fluid streams.

4. Apparatus for the accurate measurement of fluid samples and the transference thereof from one fluid stream to another fluid stream comprising, in combination, a fixed section and a rotor section compressively held in sliding contact; said fixed section being provided with a plurality of first passage means and a plurality of conduit connection means arranged to form inlet and outlet connections with two fluid streams; said rotor section being provided with a plurality of second passage means and a sample chamber; said first passage means connecting to said conduit connection means and being capable of registering with said second passage means and with said sample chamber; said second passage means and said sample chamber spaced and disposed about the rotational axis of said rotor section for selectively connecting said sample chamber to one of said fluid streams while concurrently connecting one of said second passage means into the remaining fluid stream; said sample chamber being provided with volumetric adjustment means comprising a precisely-fitted, reciprocally-movable piston within said sample chamber and means for the accurate positioning of said piston within said chamber; and means for rotatably positioning said rotor section with respect to said fixed section to selectively connect said sample chamber into either one of said fluid streams.

References Cited in the file of this patent

UNITED STATES PATENTS

| | | |
|---|---|---|
| 637,612 | Hopper | Nov. 21, 1899 |
| 2,339,908 | Brewer et al. | Jan. 25, 1944 |
| 2,729,105 | McFarland et al. | Jan. 3, 1956 |
| 2,757,541 | Watson et al. | Aug. 7, 1956 |
| 3,005,553 | Roberts et al. | Oct. 24, 1961 |